United States Patent
Huang et al.

(10) Patent No.: US 12,238,129 B2
(45) Date of Patent: Feb. 25, 2025

(54) CUSTOMIZED ANOMALY DETECTION

(71) Applicant: Microsoft Technology Licensing, LLC, Redmond, WA (US)

(72) Inventors: Congrui Huang, Redmond, WA (US); Yujing Wang, Redmond, WA (US); Bixiong Xu, Redmond, WA (US); Guodong Xing, Redmond, WA (US); Mao Yang, Redmond, WA (US); Jie Tong, Redmond, WA (US); Jing Bai, Redmond, WA (US); Meng Ai, Redmond, WA (US); Qi Zhang, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 119 days.

(21) Appl. No.: 17/783,240

(22) PCT Filed: Nov. 17, 2020

(86) PCT No.: PCT/US2020/060814
§ 371 (c)(1),
(2) Date: Jun. 7, 2022

(87) PCT Pub. No.: WO2021/141674
PCT Pub. Date: Jul. 15, 2021

(65) Prior Publication Data
US 2023/0029794 A1 Feb. 2, 2023

(30) Foreign Application Priority Data
Jan. 7, 2020 (CN) .......................... 202010013081.4

(51) Int. Cl.
*H04L 9/40* (2022.01)
*H04L 41/16* (2022.01)

(52) U.S. Cl.
CPC .......... *H04L 63/1425* (2013.01); *H04L 41/16* (2013.01); *H04L 63/20* (2013.01)

(58) Field of Classification Search
CPC ...... H04L 41/16; H04L 63/1425; H04L 63/20
(Continued)

(56) References Cited

U.S. PATENT DOCUMENTS

| 10,681,060 B2 * | 6/2020 | Scheidler ............... G06N 20/00 |
| 2008/0208526 A1 * | 8/2008 | Thibaux .............. H04L 63/1425 702/176 |

(Continued)

FOREIGN PATENT DOCUMENTS

| CN | 109032829 A | 12/2018 |
| CN | 109784042 A | 5/2019 |
| CN | 110598851 A | 12/2019 |

OTHER PUBLICATIONS

Choudhary, Pramit, "Introduction to Anomaly Detection", Retrieved From: https://blogs.oracle.com/ai-and-datascience/post/introduction-to-anomaly-detection, Feb. 15, 2017, 8 Pages.

(Continued)

*Primary Examiner* — Teshome Hailu
(74) *Attorney, Agent, or Firm* — Schwegman Lundberg & Woessner, P.A.

(57) ABSTRACT

Methods and apparatuses for implementing customized anomaly detection. A time-series data including a plurality of data points is obtained. Anomaly detection is performed to the time-series data with an anomaly detection model. A feedback associated with an anomaly detection result of at least one data point in the time-series data is received. The anomaly detection model is updated based at least on the feedback through reinforcement learning.

12 Claims, 6 Drawing Sheets

(58) Field of Classification Search
USPC .......................................................... 726/23
See application file for complete search history.

(56) References Cited

U.S. PATENT DOCUMENTS

| | | | | |
|---|---|---|---|---|
| 2009/0106839 | A1* | 4/2009 | Cha | H04L 63/1416 726/23 |
| 2015/0355957 | A1* | 12/2015 | Steiner | G06F 21/552 714/37 |
| 2017/0279685 | A1 | 9/2017 | Mota et al. | |
| 2017/0279834 | A1* | 9/2017 | Vasseur | H04L 43/024 |
| 2017/0339022 | A1* | 11/2017 | Hegde | H04L 41/06 |
| 2018/0295147 | A1* | 10/2018 | Haga | H04L 67/12 |
| 2019/0370610 | A1 | 12/2019 | Batoukov et al. | |
| 2019/0384257 | A1 | 12/2019 | Zhang et al. | |
| 2020/0053112 | A1* | 2/2020 | Torisaki | H04L 67/12 |
| 2020/0322362 | A1* | 10/2020 | Park | H04L 63/1425 |
| 2021/0160262 | A1* | 5/2021 | Bynum | H04L 43/16 |
| 2021/0185084 | A1* | 6/2021 | Sodja | H04L 63/1433 |

OTHER PUBLICATIONS

Koduvely, Hari, "Anomaly Detection through Reinforcement Learning", In Proceedings of Conference: Artificial-Intelligence-Machine-Learning-Ottawa-MeetUp, Jan. 2018, 28 Pages.

Zhong, et al., "Deep Actor-Critic Reinforcement Learning for Anomaly Detection", In Repository of arXiv:1908.10755v1, Aug. 28, 2019, 6 Pages.

"International Search Report and Written Opinion Issued in PCT Application No. PCT/US20/060814", Mailed Date: Mar. 2, 2021, 13 Pages.

Office Action Received for Chinese Application No. 202010013081.4, mailed on Feb. 27, 2024, 12 pages (English Translation Provided).

Communication pursuant to Article 94(3) received in European Application No. 20821541.8, mailed on Aug. 9, 2024, 5 pages.

Office Action Received for Chinese Application No. 202010013081.4, mailed on Sep. 19, 2024, 11 pages. (English Translation Provided).

Office Action Received for Chinese Application No. 202010013081.4, mailed on Nov. 27, 2024, 11 pages. (English Translation Provided).

* cited by examiner

CUSTOMIZED ANOMALY DETECTION

CROSS-REFERENCE TO RELATED APPLICATION

This application is a U.S. National Stage Filing under 35 U.S.C. 371 of International Patent Application Serial No. PCT/US2020/060814, filed Nov. 17, 2020, and published as WO 2021/141674 A1 on Jul. 15, 2021, which claims priority to Chinese Application No. 202010013081.4, filed Jan. 7, 2020, which applications and publication are incorporated herein by reference in their entirety.

BACKGROUND

Anomaly detection may discover abnormal or unexpected incident in a time-series data. Herein, a time-series data refers to a data sequence recorded in a chronological order, and data points in the data sequence reflect state or degree of changes of a particular phenomenon, index, matter, etc. along with time. Anomaly detection is widely implemented in many industrial applications, and is an important research area in data mining. Accurate anomaly detection may trigger prompt troubleshooting, help to avoid loss in revenue, maintain the reputation and branding of an operating entity, etc. Many large companies have built their own anomaly detection systems, to monitor healthiness of their business, products, services, etc. For example, through an anomaly detection system, an Internet company may monitor in real time various metrics of its applications and services, e.g., page views, sales revenue, etc. An anomaly detection system may monitor time-series data continuously, and alert for potential incidents timely. When an administrator or a user receives an alert about an incident, he may make a decision for this incident timely.

SUMMARY

This Summary is provided to introduce a selection of concepts that are further described below in the Detailed Description. It is not intended to identify key features or essential features of the claimed subject matter, nor is it intended to be used to limit the scope of the claimed subject matter.

Embodiments of the present disclosure propose methods and apparatuses for implementing customized anomaly detection. A time-series data including a plurality of data points may be obtained. Anomaly detection may be performed to the time-series data with an anomaly detection model. A feedback associated with an anomaly detection result of at least one data point in the time-series data may be received. The anomaly detection model may be updated based at least on the feedback through reinforcement learning.

It should be noted that the above one or more aspects comprise the features hereinafter fully described and particularly pointed out in the claims. The following description and the drawings set forth in detail certain illustrative features of the one or more aspects. These features are only indicative of the various ways in which the principles of various aspects may be employed, and this disclosure is intended to include all such aspects and their equivalents.

BRIEF DESCRIPTION OF THE DRAWINGS

The disclosed aspects will hereinafter be described in connection with the appended drawings that are provided to illustrate and not to limit the disclosed aspects.

DETAILED DESCRIPTION

Figure 1:
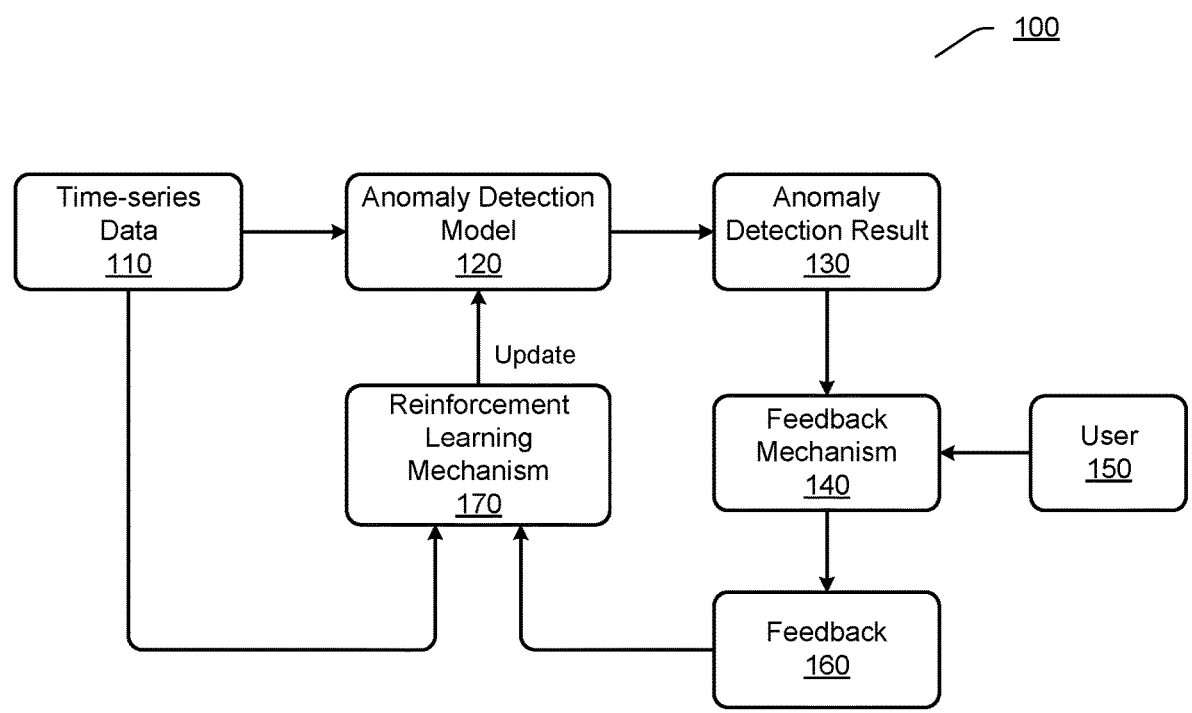
FIG. 1 illustrates an exemplary process of performing customized anomaly detection according to an embodiment.

The present disclosure will now be discussed with reference to several example implementations. It is to be understood that these implementations are discussed only for enabling those skilled in the art to better understand and thus implement the embodiments of the present disclosure, rather than suggesting any limitations on the scope of the present disclosure.

Existing anomaly detection techniques may be categorized into statistical approach, supervised approach, unsupervised approach, etc. Statistical approach-based anomaly detection may comprise hypothesis testing model, wavelet analysis model, singular value decomposition (SVD) model, auto-regressive integrated moving average (ARIMA) model, Fast Fourier Transform (FFT) model, etc. The statistical approach-based anomaly detection may be easily adopted online, but its accuracy is not sufficient for industrial applications. Supervised approach-based anomaly detection has high accuracy. However, since it is difficult to obtain data with a large scale of continuous labels in the industrial environment, the supervised approach-based anomaly detection is difficult to adapt to online applications. Unsupervised approach-based anomaly detection may reconstruct probabilities of normal time-series data, and abnormal data points are reported when a reconstruction error is higher than a threshold. However, the unsupervised approach-based anomaly detection is time-consuming or parameter-sensitive.

Usually, an anomaly detection system is required to monitor various types of time-series data from various application scenarios. For industrial anomaly detection services, it is very important to perform anomaly detection to various types of time-series data. Although the existing anomaly detection techniques are proposed for performing anomaly detection to various types of time-series data, they cannot show a good performance for a specific type of time-series data, especially when a user needs to define abnormal instances by himself. For time-series data of a specific user, it is possible that not each detected anomaly affects indeed the user's business. The user may desire to customize anomaly detection, such that anomalies of interest, anomalies more important for his business, etc. may be identified more precisely.

Embodiments of the present disclosure propose to implement customized anomaly detection based on a user's feedbacks. The embodiments of the present disclosure incorporate a feedback mechanism into an anomaly detection system, wherein the feedback mechanism enables the user to provide feedback signals to the anomaly detection system. The anomaly detection system may select a better anomaly detection model having more precise hyper-parameters based at least on the user's feedbacks, thus providing more satisfactory detection results to the user. For example, an anomaly detection model may be firstly used for performing anomaly detection to a time-series data. Through the feedback mechanism, the user may verify whether anomalies in anomaly detection results are real anomalies he cares, whether there are critical anomalies that haven't been detected, etc., and feedback signals from the user may be taken as additional inputs to the anomaly detection system. Through converting the feedbacks into a reward, the anomaly detection system may utilize reinforcement learning to find a best anomaly detection solution for the user on a particular time-series data. The reinforcement learning aims to maximize the reward through enabling the anomaly detection system to take appropriate actions, e.g., selecting proper hyper-parameters for the anomaly detection model. Accordingly, customized anomaly detection for a specific user on a particular time-series data is achieved. Even the user may only provide limited feedbacks on the time-series data, through reinforcement learning, the user's requirements may be still effectively adapted, and more precise anomaly detection results may be provided. The customized anomaly detection according to the embodiments of the present disclosure does not need a large scale of labeled data as required by the supervised approach-based anomaly detection. Through the reinforcement learning, the anomaly detection model may effectively adapt to the user's requirements or imitate experiences in the application field. Moreover, the reinforcement learning-based architecture may enable the anomaly detection model to be improved continuously and effectively.

FIG. 1 illustrates an exemplary process 100 of performing customized anomaly detection according to an embodiment. The process 100 may be performed by a customized anomaly detection system according to an embodiment of the present disclosure, which intends to perform anomaly detection, which can be customized by a user, on a time-series data 110. Herein, a user may broadly refer to a company, an organization, an individual, etc. that uses customized anomaly detection services according to the embodiments of the present disclosure. For example, a user may own, produce, provide, or manage the time-series data 110, and desire to monitor abnormal incidents in the time-series data 110.

The time-series data 110 may come from various types of data source, e.g., online streaming data, cloud storage, databases, etc., and may be for various types of application scenario or business, e.g., service traffic, product sales revenue, Internet of Things (IoT) data, machine operation data, business operation data, etc. It should be understood that the embodiments of the present disclosure are not limited to any particular type of time-series data, but may be applied to different types of time-series data in different application scenarios in the same or similar approach. The time-series data 110 may be updated according to a specified time granularity. The time-series data 110 may include a plurality of data points, and the time granularity indicates the update frequency of these data points, e.g., minute, hour, day, etc. Each data point includes a metric value collected at a corresponding time point.

An anomaly detection model 120 may be utilized for monitoring anomalies in the time-series data 110. For example, the anomaly detection model 120 may perform anomaly detection to the time-series data 110 to obtain anomaly detection results 130. The anomaly detection may be performed in real time, periodically, in response to specific triggers, etc. Given a time-series data, e.g., a sequence of time-series data points $x=x_1, x_2, \ldots, x_n$, the task of the anomaly detection model 120 is to generate an output sequence $y=y_1, y_2, y_n$, wherein $y_i \in \{0,1\}$ indicates whether $x_i$ is an abnormal data point. The anomaly detection model 120 may be configured with one or more hyper-parameters.

In an implementation, the hyper-parameters may comprise at least one detection approach adopted by the anomaly detection model 120. The detection approach may comprise any existing anomaly detection techniques, e.g., statistical approach-based anomaly detection, supervised approach-based anomaly detection, unsupervised approach-based anomaly detection, etc. Specifically, the detection approach may comprise, e.g., Spectral Residual (SR), DONUT, Twitter-AD, Luminol, SPOT, DSPOT, FFT, etc. Herein, the anomaly detection model 120 may be a model that is based on a single detection approach or an integrated model that is based on two or more detection approaches. In the case that the anomaly detection model 120 is an integrated model, weighting, voting, etc. may be performed among anomaly detection results obtained by different detection approaches through any predefined mechanism, so as to derive the final anomaly detection results 130.

In an implementation, the hyper-parameters may comprise parameters associated with at least one detection approach adopted by the anomaly detection model 120. Different detection approaches may have specific parameters. Taking the detection approach SR as an example, its parameters may comprise, e.g., a sliding window size, the number of estimated points, a threshold for anomaly detection, etc.

In an implementation, the hyper-parameters may comprise a detection window size of the anomaly detection model 120. Taking a data point $x_i$ as an example, a detection window may cover a plurality of data points in the time-series data, that are within a predetermined time range including the data point $x_i$, so that it may be determined whether the data point $x_i$ is abnormal based on characteristics of these data points.

In an implementation, the hyper-parameters may comprise detection sensitivity of the anomaly detection model 120. The detection sensitivity may refer to a degree by which a metric value of a data point exceeds a normal range of metric value when the data point is determined as abnormal. In a case, the detection sensitivity may be indicated by a size of a metric threshold, wherein it may be determined whether a data point is abnormal through comparing a metric value of the data point with the metric threshold. In a case, the detection sensitivity may be indicated by a degree threshold of deviation from data change trend, wherein a data point may be determined as abnormal when a degree of deviation of the data point's metric value from data change trend exceeds the degree threshold.

It should be understood that the hyper-parameters of the anomaly detection model 120 are not limited to one or more of the above examples, but may comprise any other types of hyper-parameter.

The anomaly detection results 130 may comprise anomaly detection results of all or a part of the data points in the time-series data 110, e.g., abnormal, normal, etc. The anomaly detection results 130 may be presented in various approaches, e.g., anomaly detection results presented in an explicit or implicit manner on a time-series data curve composed of all or a part of the data points, anomaly detection results indicated in a time-series data table composed of all or a part of the data points, etc.

The process 100 may comprise obtaining a feedback 160 on the anomaly detection results 130 from a user 150 through a feedback mechanism 140. The feedback mechanism 140 may broadly refer to an information interaction mechanism between the customized anomaly detection system and the user 150. In one aspect, the feedback mechanism 140 may provide or present the anomaly detection results 130 to the user 150 in various approaches, e.g., via email, through user interfaces of the anomaly detection system, etc. In another aspect, the user 150 may provide the feedback 160 via the feedback mechanism 140 in various approaches. Taking an example of providing the anomaly detection results 130 through a time-series data curve, if the user thinks that an anomaly detection result of a certain data point is false, the anomaly detection result of the data point may be corrected on the time-series data curve.

In an implementation, the feedback 160 may comprise correcting at least one data point, which is indicated as abnormal by an anomaly detection result, as a non-abnormal data point. In an implementation, the feedback 160 may comprise correcting at least one data point, which is indicated as normal by an anomaly detection result, as an abnormal data point. In an implementation, the feedback 160 may comprise labeling at least one data point, which is indicated as abnormal by an anomaly detection result, as a key abnormal data point, wherein the key abnormal data point may refer to an abnormal data point with high importance or representativeness for the business of the user 150, which should be detected as accurately and comprehensively as possible. It should be understood that the feedback 160 is not limited to one or more types of feedback information in the above examples, but may comprise any other types of feedback information.

The feedback 160 from the user 150 may reflect the user's customization intention to the anomaly detection system on the time-series data 110, e.g., the user desires that the anomaly detection system can detect certain data points as abnormal, detect certain data points as normal, label certain abnormal data points as key abnormal data points, etc. The feedback 160 may trigger the operation of a reinforcement learning mechanism 170. The reinforcement learning mechanism 170 may learn the user's customization intention on the time-series data 110 at least in response to the feedback 160, thereby obtaining a customized anomaly detection system. In an implementation, the reinforcement learning mechanism 170 may update the anomaly detection model 120 based at least on the feedback 160. For example, through the reinforcement learning mechanism 170, the hyper-parameters of the anomaly detection model 120 may be updated accordingly, and the updated hyper-parameters may be better adapted to the user's requirements.

It should be understood that the process 100 may be continuously performed, thus enabling the customized anomaly detection system to be continuously improved along with a user's feedbacks. Specifically, the time-series data 110 is continuously updated with time, e.g., new data points are continuously collected and added to the time-series data 110, so that whenever a new feedback by the user is received, the reinforcement learning mechanism may be triggered to update the anomaly detection model.

Figure 2:
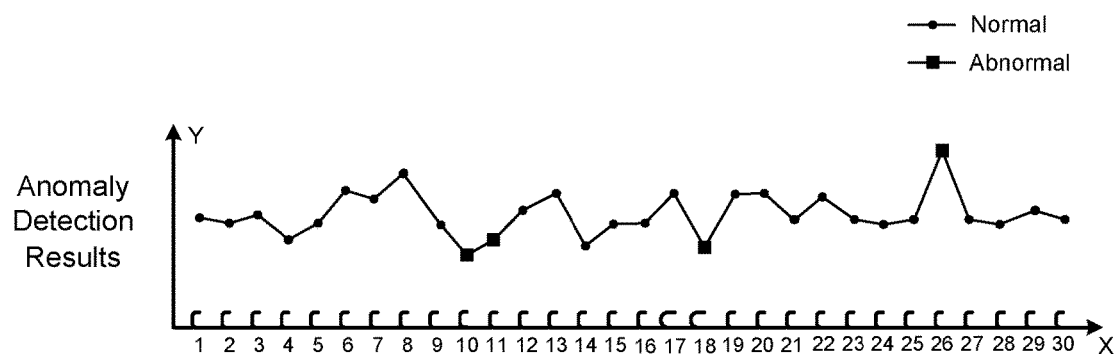
FIG. 2 illustrates exemplary user interfaces of a feedback mechanism according to an embodiment.
Figure 2:
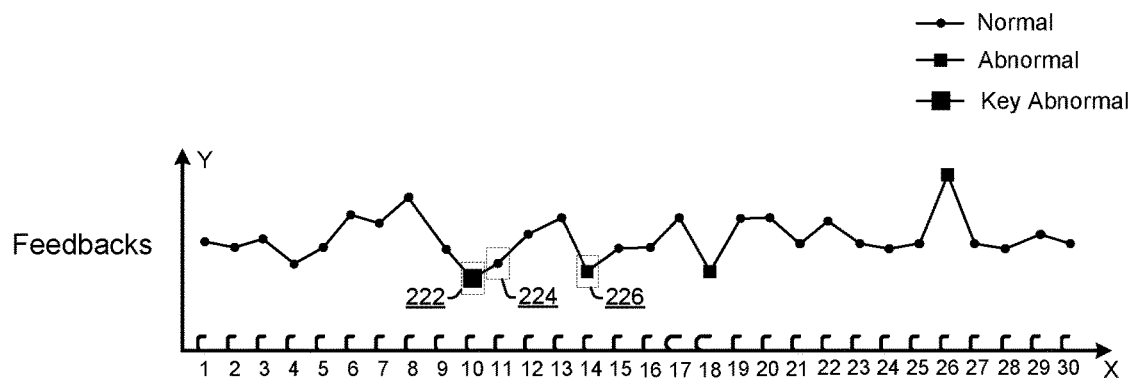

FIG. 2 illustrates exemplary user interfaces of a feedback mechanism according to an embodiment. Through the user interfaces in FIG. 2, a customized anomaly detection system may provide anomaly detection results to a user and obtain feedbacks from the user.

In the user interface 210, anomaly detection results are marked on a time-series data curve. 30 exemplary data points included in a time-series data are listed in a chronological order on the X axis, and a time point of each data point is denoted by a corresponding number. It should be understood that various time granularities, e.g., minute, hour, day, etc., may be adopted for the time points on the X axis. The projection of each data point on the Y axis indicates a metric value collected for this data point. Data points detected as normal are indicated by circles, and data points detected as abnormal are indicated by square blocks. As shown in the user interface 210, the $10^{th}$, $11^{th}$, $18^{th}$, and $26^{th}$ data points are detected as abnormal, while other data points are detected as normal. The curve in the user interface 210 may be presented to the user, such that the user may provide feedbacks on the anomaly detection results.

In an implementation, the user may directly correct falsely-labeled anomaly detection results on the curve. The user interface 220 shows feedbacks from the user, wherein the user corrects anomaly detection results of a part of the data points. For example, at 222, the user labels the $10^{th}$ data point, which is detected as "abnormal", as a "key abnormal data point" to indicate that this data point is an abnormal data point of great importance to the user. For example, at 224, the user corrects the $11^{th}$ data point, which is detected as "abnormal", to a "non-abnormal data point" to indicate that this data point is not an abnormal data point in deed. For example, at 226, the user corrects the $14^{th}$ data point, which is detected as "normal", to an "abnormal data point" to indicate that this data point is an abnormal data point in deed.

The customized anomaly detection system may identify feedbacks by the user according to the curve in the user interface 220, and further operate the reinforcement learning mechanism in response to the feedbacks by the user.

It should be understood that the embodiments of the present disclosure are not limited to present anomaly detection results and collect user feedbacks through the form of curve in FIG. 2. Moreover, the embodiments of the present disclosure are not limited to the feedback approach of directly correcting anomaly detection results on the curve as shown in FIG. 2 either, the user may also take any other approaches to provide feedbacks, e.g., correcting anomaly detection results in a form of list. The embodiments of the present disclosure aim to use user feedbacks collected via the feedback mechanism to implement customized anomaly detection, and are not limited to any specific implementation approaches of the feedback mechanism.

Figure 3:
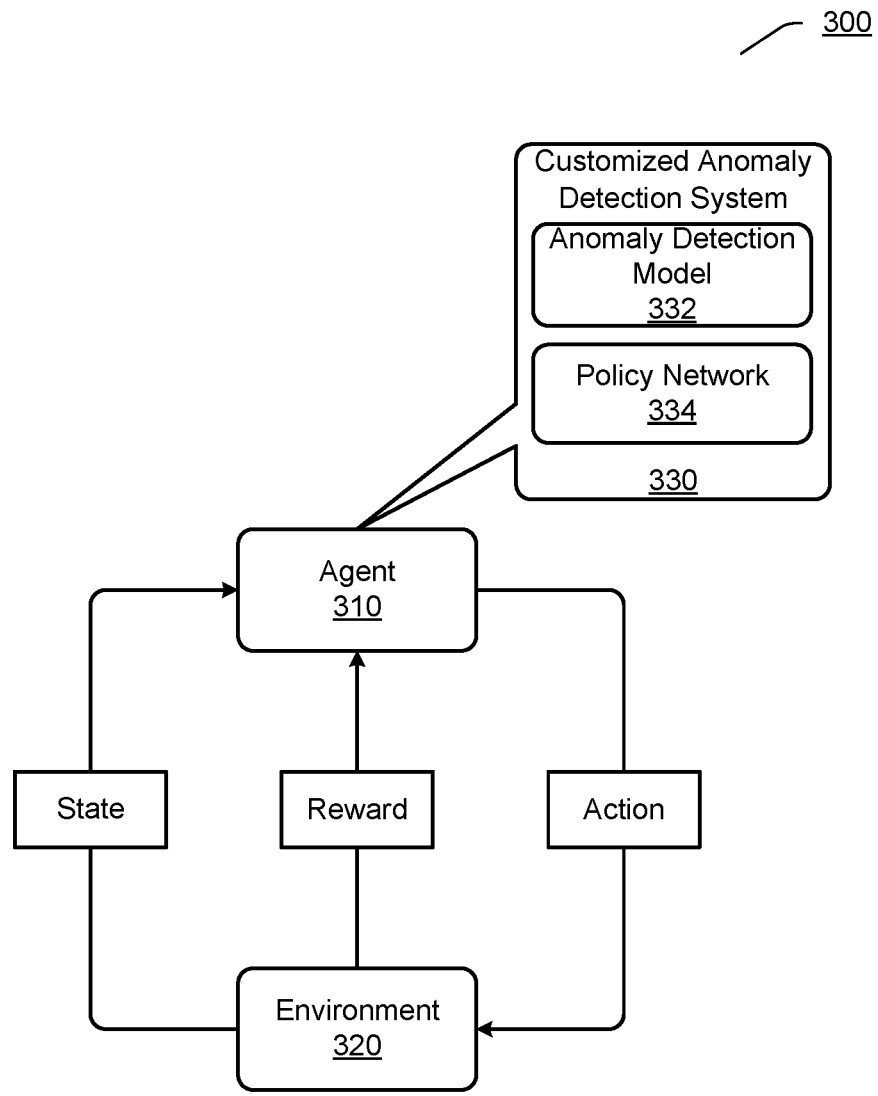
FIG. 3 illustrates an exemplary reinforcement learning process for customized anomaly detection according to an embodiment.

FIG. 3 illustrates an exemplary reinforcement learning process 300 for customized anomaly detection according to an embodiment. The reinforcement learning process 300 is an exemplary implementation approach of the reinforcement learning mechanism 170 in FIG. 1.

Reinforcement learning aims to how to take actions based on the environment to achieve maximized expected benefits. In the basic reinforcement learning architecture, there are continuous interactions between an agent and the environment. The environment generates a reward for an action taken by the agent, and the agent generates the next action under the incentive by the reward to pursue the maximization of reward. The reinforcement learning process 300 according to the embodiment may implement customized anomaly detection under the basic reinforcement learning architecture.

Agent 310 may correspond to a customized anomaly detection system 330 according to the embodiments of the present disclosure. The customized anomaly detection system 330 may utilize a reinforcement learning algorithm for deciding an action to be taken, and generate anomaly detection results for a time-series data based on the action. The customized anomaly detection system 330 may comprise, e.g., an anomaly detection model 332, a policy network 334, etc. The policy network 334 may decide an action to be taken, and the anomaly detection model 332 may generate anomaly detection results under the action. The anomaly detection results may then be used for calculating a reward for the next action, etc.

Action may refer to selecting or determining hyper-parameters for the anomaly detection model. For example, action information may comprise at least one of: at least one selected detection approach; configured parameters associated with the at least one detection approach; a determined detection window size; a determined detection sensitivity; and so on.

The environment 320 may refer to a platform on which the customized anomaly detection system runs. The platform may obtain an action taken by the customized anomaly detection system, provide anomaly detection results to a user, collect feedbacks on the anomaly detection results by the user to generate the next iteration of reward and state, etc.

Reward is used for evaluating the customized anomaly detection system's action, e.g., measuring the success or failure of action taken by the customized anomaly detection system in each state. The reinforcement learning process 300 aims to maximize the reward obtained for the time-series data. Here, the reward may be a cumulative value calculated for all previous data points at each iteration. In an implementation, anomaly detection may be regarded as a classification issue, e.g., classifying data points as abnormal, normal, etc., and thus precision, recall rate, F1 score, etc. may be adopted as reward criteria. The calculation of reward considers at least a feedback by the user and the anomaly detection results predicted by the customized anomaly detection system, wherein the feedback is used as a ground truth label. The precision may refer to how many samples are correctly predicted among a class of predicted samples, e.g., how many data points are real abnormal data points among data points that are predicted as abnormal. The recall rate may refer to how many samples are correctly predicted among a class of original samples, e.g., how many data points are predicted as abnormal among real abnormal data points. The F1 score may be calculated based on the precision and the recall rate, e.g., F1 score=2*(precision*recall rate)/(precision+recall rate). It should be understood that the reward criteria is not limited to the above examples, and any other criteria may be adopted.

State may comprise various types of information that may be obtained from the environment currently. In an implementation, state information may comprise various statistical features from a time-series data. For example, the statistical features may comprise at least one of: mean value, standard deviation, quantile, stationary, trend, minimum value, maximum value, seasonality, value distribution, etc. In an implementation, the state information may comprise features related to an application scenario. For example, the features related to an application scenario may comprise user service category, special incident, etc. The user service category may refer to a service type involved in the user's time-series data, e.g., manufacturing, finance, development and operation, etc. The special incident may refer to an incident that occurs during a specific time period and may affect a part of data points in the time-series data, e.g., a holiday incident. Taking the holiday incident "Christmas" as an example, people's shopping behaviors usually increase around Christmas, which may lead to specific changes around Christmas in a time-series data related to product sales revenue, e.g., metric values of data points generally increase significantly. Such specific changes in the metric values of data points may be expected by the user, and thus should not be detected as abnormal. In an implementation, the state information may comprise hyper-parameters of the anomaly detection model, e.g., hyper-parameters configured for the anomaly detection model currently. It should be understood that the embodiments of the present disclosure are not limited to the above several exemplary state information, but may comprise any other types of state information.

The policy network 334 may adopt a learned policy to determine the next action based on the current state. The policy may refer to mapping from states to actions, wherein the actions aim to result in maximized rewards. The policy adopted by the policy network 334 may be continuously optimized through the reinforcement learning process 300 and at least in response to feedbacks by the user. The optimized policy network may determine the next action, e.g., re-determining the hyper-parameters of the anomaly detection model 332. The re-determining of the hyper-parameters of the anomaly detection model 332 may comprise at least one of: selecting at least one detection approach; configuring parameters associated with the at least one detection approach; determining a detection window size; determining detection sensitivity; and so on. For example, the optimized policy network may determine to switch the current detection approach to another detection approach, increase the detection window size, reduce the detection sensitivity, etc. The policy network 334 may be based on a neural architecture. For example, the policy network 334 may be implemented based on Long Short Term Memory (LSTM) or Gated Recurrent Unit (GRU). In an implementation, through the reinforcement learning process 300, at least one loss function of the policy network may calculate a policy gradient based on anomaly detection results, feedbacks, etc., wherein the policy gradient may further adjust the policy network so that the policy adopted by the policy network may facilitate to maximize the rewards.

Optionally, in an implementation, after the policy network 334 determines the next action, historical data may be used for testing whether the action results in maximization of the reward. For example, anomaly detection may be re-executed on the previous data points based on the action to obtain experimental anomaly detection results, and a reward may be calculated based on the experimental anomaly detection results as well as the user's previous feedbacks so as to determine whether the reward is maximized. If not, the policy network 334 may attempt to re-determine the next action.

It should be understood that FIG. 3 only exemplarily illustrates the reinforcement learning process according to the embodiment of the present disclosure with the basic reinforcement learning architecture, in fact, the reinforcement learning process may be implemented based on any specific reinforcement learning architecture, e.g., A2C, A3C, PPO, SAC, etc.

Figure 4:
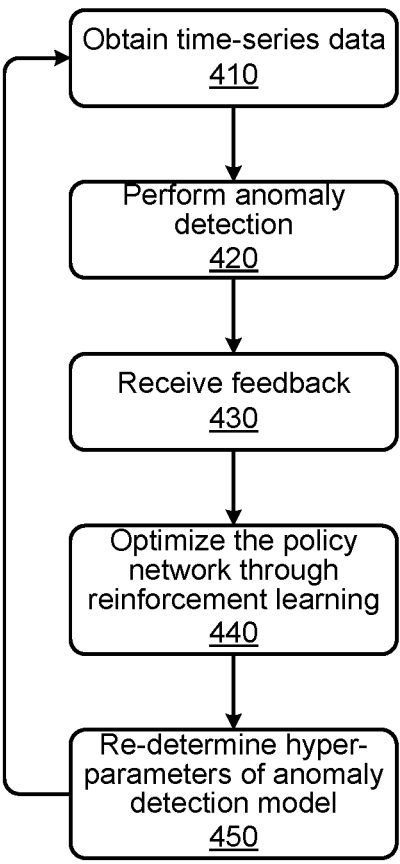
FIG. 4 illustrates an exemplary process of implementing customized anomaly detection according to an embodiment.

FIG. 4 illustrates an exemplary process 400 of implementing customized anomaly detection according to an embodiment. The process 400 may be performed by a customized anomaly detection system according to the embodiments of the present disclosure.

At 410, a time-series data may be obtained. The time-series data may be provided by a user who owns or manages the time-series data, or may be automatically collected from a user by the customized anomaly detection system.

At 420, anomaly detection may be performed on the obtained time-series data to obtain anomaly detection results. For example, an anomaly detection model in the customized anomaly detection system may be utilized for performing anomaly detection on the time-series data. The anomaly detection model is configured with corresponding hyper-parameters. The anomaly detection results may be provided to the user.

At 430, feedbacks on the anomaly detection results by the user may be received. The feedbacks may comprise corrections by the user for possible false anomaly detection results of one or more data points.

After receiving the feedbacks, the process 400 may update the anomaly detection model through a reinforcement learning process. For example, at 440, a policy network in the customized anomaly detection system may be optimized based at least on the feedbacks through reinforcement learning, such that a policy adopted by the optimized policy network considers at least the user's customization intention which is reflected by the feedbacks.

At 450, hyper-parameters of the anomaly detection model may be re-determined through the optimized policy network, so as to update the anomaly detection model. Through configuring or updating the anomaly detection model with the re-determined hyper-parameters, the anomaly detection model may detect abnormal data points in the time-series data in the subsequent anomaly detection with criteria that better conforms to the user's customization intention.

After the hyper-parameters of the anomaly detection model are re-determined, the process 400 returns to 410 to continue to perform customized anomaly detection on the updated time-series data. The updated time-series data comprises newly-added data points.

Through performing the process 400 iteratively, feedbacks by the user may be continuously collected and the anomaly detection model may be continuously updated, thus enabling the whole anomaly detection system to achieve better customization for the time-series data or the user.

Figure 5:
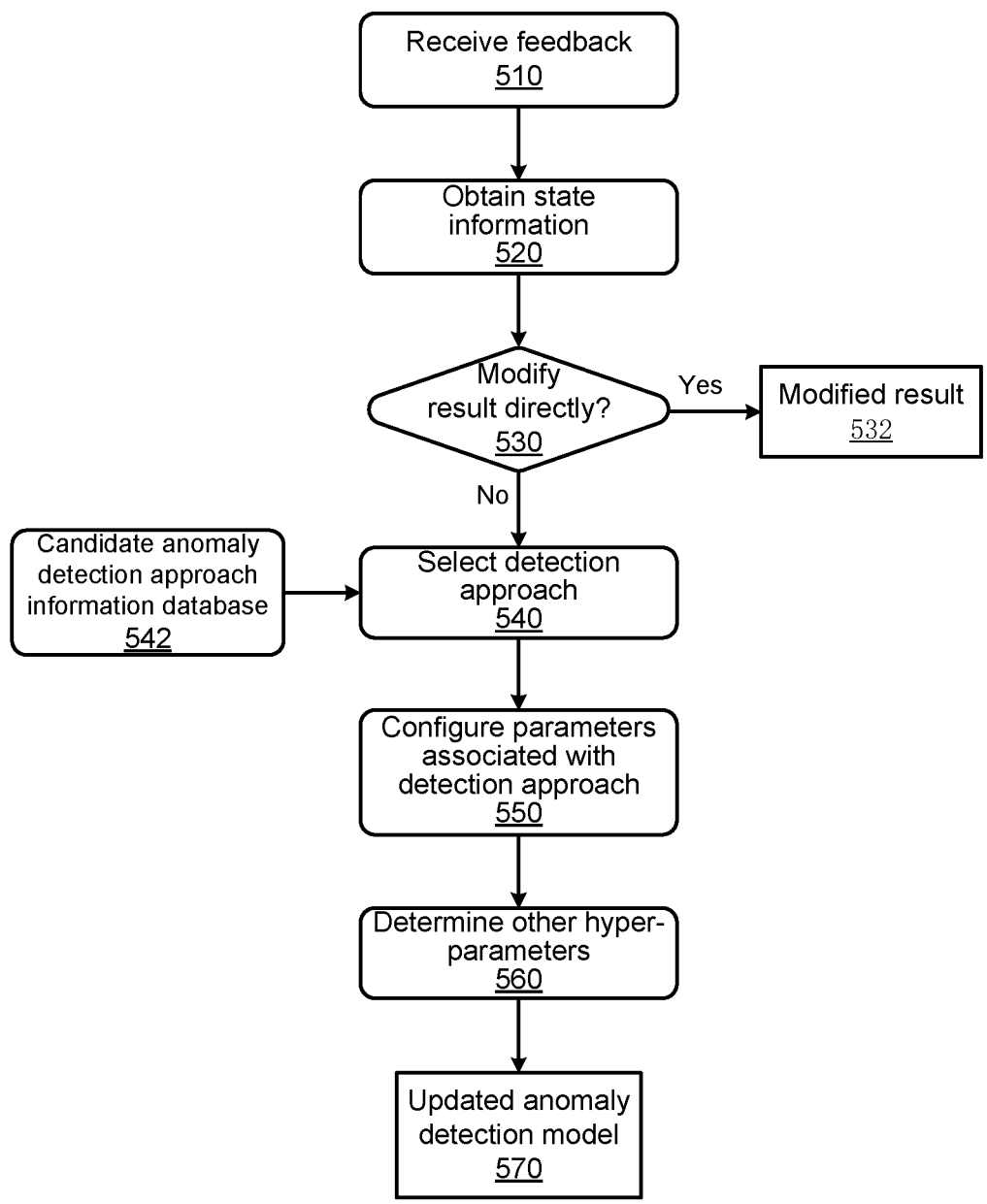
FIG. 5 illustrates an exemplary operating process of a policy network according to an embodiment.

FIG. 5 illustrates an exemplary operating process 500 of a policy network according to an embodiment. The process 500 is only used for illustrating exemplary functions implemented by the policy network.

At 510, feedbacks on anomaly detection results by a user may be received. For example, the feedbacks may comprise corrections for an anomaly detection result of a certain data point by the user.

At 520, current state information may be obtained. The state information may correspond to the state shown in FIG. 3.

At 530, the policy network may determine whether it is needed to directly correct the anomaly detection result of the data point for which the feedback is provided by the user. In an implementation, the policy network may determine whether any optional hyper-parameters of the anomaly detection model are not able to satisfy the feedback by the user, e.g., whether no matter how to configure the anomaly detection model, it cannot obtain anomaly detection results conforming to the user feedback.

If it is determined at 530 that the anomaly detection result needs to be corrected directly, the policy network may modify the anomaly detection result of the data point directly according to the user feedback to obtain a corrected result 532.

If it is determined at 530 that the anomaly detection result does not need to be corrected directly, the policy network may further re-determine the hyper-parameters of the anomaly detection model.

At 540, the policy network may select at least one detection approach for the anomaly detection model. In an implementation, a candidate anomaly detection approach information database 542 may be prepared in advance, which includes a variety of selectable anomaly detection approaches.

At 550, the policy network may configure parameters for the selected detection approach. The parameters may be specific to the selected detection approach.

At 560, the policy network may determine other possible hyper-parameters for the anomaly detection model, e.g., detection window size, detection sensitivity, etc.

Finally, through the re-determination of the hyper-parameters of the anomaly detection model by the policy network, an updated anomaly detection model 570 may be obtained. The updated anomaly detection model may then be used for performing anomaly detection to subsequent data points.

It should be understood that all the steps in the process 500 are exemplary, and may be changed in any approaches according to specific application requirements. For example, the step 530 may be omitted from the process 500. For example, the policy network may only need to perform one or more of the steps 540, 550 and 560.

Figure 6:
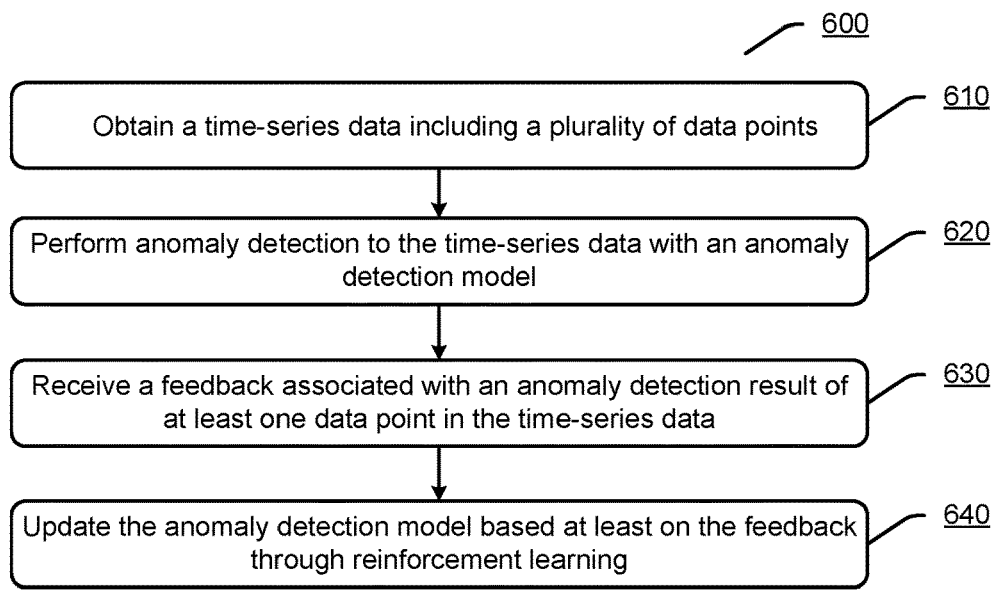
FIG. 6 illustrates a flowchart of an exemplary method for implementing customized anomaly detection according to an embodiment.

FIG. 6 illustrates a flowchart of an exemplary method 600 for implementing customized anomaly detection according to an embodiment.

At 610, a time-series data including a plurality of data points may be obtained.

At 620, anomaly detection may be performed to the time-series data with an anomaly detection model.

At 630, a feedback associated with an anomaly detection result of at least one data point in the time-series data may be received.

At 640, the anomaly detection model may be updated based at least on the feedback through reinforcement learning.

In an implementation, the feedback may comprise at least one of: correcting the at least one data point, which is indicated as abnormal by the anomaly detection result, as a non-abnormal data point; correcting the at least one data point, which is indicated as normal by the anomaly detection result, as an abnormal data point; and labeling the at least one data point, which is indicated as abnormal by the anomaly detection result, as a key abnormal data point.

In an implementation, hyper-parameters of the anomaly detection model may comprise at least one of: at least one detection approach; parameters associated with the at least one detection approach; a detection window size; and detection sensitivity.

In an implementation, the updating the anomaly detection model may comprise: optimizing a policy network based at least on the feedback through the reinforcement learning; and re-determining hyper-parameters of the anomaly detection model through the optimized policy network.

The optimizing a policy network may comprise: calculating a policy gradient based at least on the anomaly detection result and the feedback; and adjusting the policy network with the policy gradient.

The re-determining hyper-parameters of the anomaly detection model may comprise at least one of: selecting at least one detection approach; configuring parameters associated with the at least one detection approach; determining a detection window size; and determining detection sensitivity.

The reinforcement learning may be for maximizing a reward obtained for the time-series data, the reward being determined based at least on the anomaly detection result and the feedback. The reward may be at least one of precision, recall rate and F1 score.

State information in the reinforcement learning may comprise at least one of: statistical features from the time-series data; features associated with an application scenario; and hyper-parameters of the anomaly detection model.

Action information in the reinforcement learning may comprise at least one of: at least one selected detection approach; configured parameters associated with the at least one detection approach; a determined detection window size; and a determined detection sensitivity The policy network may be implemented based on LSTM or GRU.

It should be appreciated that the method 600 may further comprise any steps/processes for implementing customized anomaly detection according to the embodiments of the present disclosure as mentioned above.

Figure 7:
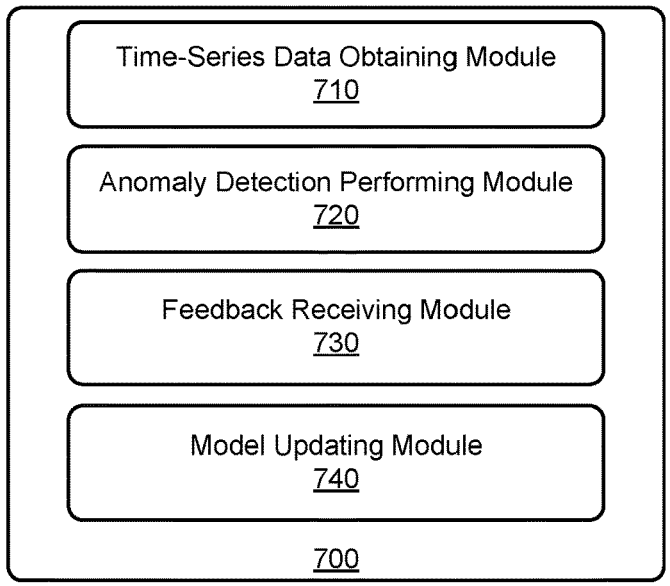
FIG. 7 illustrates an exemplary apparatus for implementing customized anomaly detection according to an embodiment.

FIG. 7 illustrates an exemplary apparatus 700 for implementing customized anomaly detection according to an embodiment.

The apparatus 700 may comprise: a time-series data obtaining module 710, for obtaining a time-series data including a plurality of data points; an anomaly detection performing model 720, for performing anomaly detection to the time-series data with an anomaly detection model; a feedback receiving module 730, for receiving a feedback associated with an anomaly detection result of at least one data point in the time-series data; and a model updating model 740, for updating the anomaly detection model based at least on the feedback through reinforcement learning.

In an implementation, the feedback may comprise at least one of: correcting the at least one data point, which is indicated as abnormal by the anomaly detection result, as a non-abnormal data point; correcting the at least one data point, which is indicated as normal by the anomaly detection result, as an abnormal data point; and labeling the at least one data point, which is indicated as abnormal by the anomaly detection result, as a key abnormal data point.

In an implementation, the model updating module may be for: optimizing a policy network based at least on the feedback through the reinforcement learning; and re-determining hyper-parameters of the anomaly detection model through the optimized policy network.

The optimizing a policy network may comprise: calculating a policy gradient based at least on the anomaly detection result and the feedback; and adjusting the policy network with the policy gradient.

The re-determining hyper-parameters of the anomaly detection model may comprise at least one of: selecting at least one detection approach; configuring parameters associated with the at least one detection approach; determining a detection window size; and determining detection sensitivity.

The reinforcement learning may be for maximizing a reward obtained for the time-series data, the reward being determined based at least on the anomaly detection result and the feedback.

State information in the reinforcement learning may comprise at least one of: statistical features from the time-series data; features associated with an application scenario; and hyper-parameters of the anomaly detection model.

Action information in the reinforcement learning may comprise at least one of: at least one selected detection approach; configured parameters associated with the at least one detection approach; a determined detection window size; and a determined detection sensitivity Moreover, the apparatus 700 may also comprise any other modules configured for performing any operations of the methods for implementing customized anomaly detection according to the embodiments of the present disclosure as mentioned above.

Figure 8:
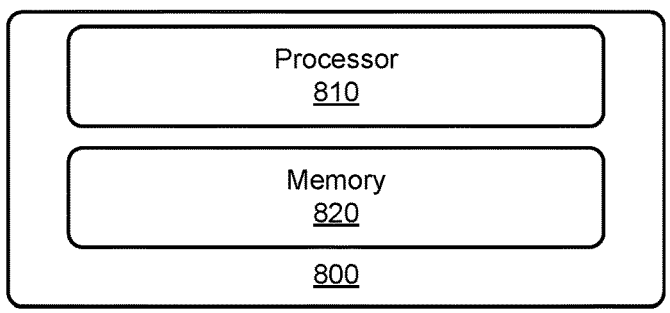
FIG. 8 illustrates an exemplary apparatus for implementing customized anomaly detection according to an embodiment.

FIG. 8 illustrates an exemplary apparatus 800 for implementing customized anomaly detection according to an embodiment.

The apparatus 800 may comprise at least one processor 810. The apparatus 800 may further comprise a memory 820 connected to the processor 810. The memory 820 may store computer-executable instructions that, when executed, cause the processor 810 to: obtain a time-series data including a plurality of data points; perform anomaly detection to the time-series data with an anomaly detection model; receive a feedback associated with an anomaly detection result of at least one data point in the time-series data; and update the anomaly detection model based at least on the feedback through reinforcement learning. Moreover, the processor 810 may be further configured for performing any other operations of the methods for implementing customized anomaly detection according to the embodiments of the present disclosure as mentioned above.

The embodiments of the present disclosure may be embodied in a non-transitory computer-readable medium. The non-transitory computer-readable medium may comprise instructions that, when executed, cause one or more processors to perform any operations of the methods for implementing customized anomaly detection according to the embodiments of the present disclosure as mentioned above.

It should be appreciated that all the operations in the methods described above are merely exemplary, and the present disclosure is not limited to any operations in the methods or sequence orders of these operations, and should cover all other equivalents under the same or similar concepts.

It should also be appreciated that all the modules in the apparatuses described above may be implemented in various approaches. These modules may be implemented as hardware, software, or a combination thereof. Moreover, any of these modules may be further functionally divided into sub-modules or combined together.

Processors have been described in connection with various apparatuses and methods. These processors may be implemented using electronic hardware, computer software, or any combination thereof. Whether such processors are implemented as hardware or software will depend upon the particular application and overall design constraints imposed on the system. By way of example, a processor, any portion of a processor, or any combination of processors presented in the present disclosure may be implemented with a microprocessor, microcontroller, digital signal processor (DSP), a field-programmable gate array (FPGA), a programmable logic device (PLD), a state machine, gated logic, discrete hardware circuits, and other suitable processing components configured to perform the various functions described throughout the present disclosure. The functionality of a processor, any portion of a processor, or any combination of processors presented in the present disclosure may be implemented with software being executed by a microprocessor, microcontroller, DSP, or other suitable platform.

Software shall be construed broadly to mean instructions, instruction sets, code, code segments, program code, programs, subprograms, software modules, applications, software applications, software packages, routines, subroutines, objects, threads of execution, procedures, functions, etc. The software may reside on a computer-readable medium. A computer-readable medium may include, by way of example, memory such as a magnetic storage device (e.g., hard disk, floppy disk, magnetic strip), an optical disk, a smart card, a flash memory device, random access memory (RAM), read only memory (ROM), programmable ROM (PROM), erasable PROM (EPROM), electrically erasable PROM (EEPROM), a register, or a removable disk. Although memory is shown separate from the processors in the various aspects presented throughout the present disclosure, the memory may be internal to the processors, e.g., cache or register.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein. All structural and functional equivalents to the elements of the various aspects described throughout the present disclosure that are known or later come to be known to those of ordinary skilled in the art are intended to be encompassed by the claims.

The invention claimed is:

1. A method for implementing customized anomaly detection, comprising:
   obtaining time-series data including a plurality of data points;
   performing anomaly detection on the time-series data with a first anomaly detection model;
   graphically presenting anomaly detection results as a function of time, wherein a first anomaly is represented by first indications and a second anomaly different from the first anomaly is represented by second indications different from the first indications;
   receiving feedback associated with an anomaly detection result of at least one data point in the time-series data, the feedback being in a form of adjustments to ones of the first indications and the second indications; and
   updating the first anomaly detection model to a second anomaly detection model different from the first anomaly detection model based at least on the feedback through reinforcement learning, wherein the updating the first anomaly detection model to the second anomaly detection model comprises:
      optimizing a policy network based at least on the feedback through the reinforcement learning, which includes:
         calculating a policy gradient based at least on the anomaly detection result and the feedback; and
         adjusting the policy network with the policy gradient; and
      determining hyper-parameters through the optimized policy network.

2. The method of claim 1, wherein the feedback comprises at least one of:
   correcting the at least one data point, which is indicated as abnormal by the anomaly detection result, as a non-abnormal data point;
   correcting the at least one data point, which is indicated as normal by the anomaly detection result, as an abnormal data point; and
   labeling the at least one data point, which is indicated as abnormal by the anomaly detection result, as a key abnormal data point.

3. The method of claim 1, wherein hyper-parameters of the second anomaly detection model comprise at least one of:
   at least one detection approach;
   parameters associated with the at least one detection approach;
   a detection window size; and
   detection sensitivity.

4. The method of claim 1, wherein the determining hyper-parameters comprises at least one of:
   determining a detection window size; and
   determining detection sensitivity.

5. The method of claim 1, wherein the reinforcement learning is for maximizing a reward obtained for the time-series data, the reward being determined based at least on the anomaly detection result and the feedback.

6. The method of claim 5, wherein the reward is at least one of precision, recall rate and F1 score.

7. The method of claim 1, wherein state information in the reinforcement learning comprises at least one of:
   statistical features from the time-series data; and
   features associated with an application scenario.

8. The method of claim 1, wherein action information in the reinforcement learning comprises at least one of:
   a determined detection window size; and
   a determined detection sensitivity.

9. The method of claim 1, wherein the policy network is implemented based on Long Short Term Memory (LSTM) or Gated Recurrent Unit (GRU).

10. An apparatus for implementing customized anomaly detection, comprising:
    a time-series data obtaining module, for obtaining time-series data including a plurality of data points;
    an anomaly detection performing module, for performing anomaly detection on the time-series data with a first anomaly detection model;
    a module for graphically presenting anomaly detection results as a function of time, wherein a first anomaly is represented by first indications and a second anomaly different from the first anomaly is represented by second indications different from the first indications;
    a feedback receiving module, for receiving feedback associated with an anomaly detection result of at least one data point in the time-series data, the feedback being in a form of adjustments to ones of the first indications and the second indications; and
    a model updating module, for updating the first anomaly detection model to a second anomaly detection model different from the first anomaly detection model based at least on the feedback through reinforcement learning, wherein the updating the first anomaly detection model to the second anomaly detection model comprises:
       optimizing a policy network based at least on the feedback through the reinforcement learning, which includes:
          calculating a policy gradient based at least on the anomaly detection result and the feedback; and
          adjusting the policy network with the policy gradient; and determining hyper-parameters through the optimized policy network.

11. The apparatus of claim 10, wherein the determining hyper-parameters comprises at least one of:
  determining a detection window size; and
  determining detection sensitivity.

12. An apparatus for implementing customized anomaly detection, comprising:
  at least one processor; and
  a memory storing computer-executable instructions that, when executed, cause the at least one processor to:
    obtain time-series data including a plurality of data points;
    perform anomaly detection on the time-series data with a first anomaly detection model;
    graphically present anomaly detection results as a function of time, wherein a first anomaly is represented by first indications and a second anomaly different from the first anomaly is represented by second indications different from the first indications;
    receive feedback associated with an anomaly detection result of at least one data point in the time-series data, the feedback being in a form of adjustments to ones of the first indications and the second indications; and
    update the first anomaly detection model to a second anomaly detection model different from the first anomaly detection model based at least on the feedback through reinforcement learning, wherein the updating the first anomaly detection model to the second anomaly detection model comprises:
      optimizing a policy network based at least on the feedback through the reinforcement learning, which includes:
        calculating a policy gradient based at least on the anomaly detection result and the feedback; and
        adjusting the policy network with the policy gradient; and
      determining hyper-parameters through the optimized policy network.

* * * * *